United States Patent
Cejka et al.

(10) Patent No.: US 11,313,946 B2
(45) Date of Patent: Apr. 26, 2022

(54) METHOD AND APPARATUS FOR IDENTIFICATION OF CALIBRATION TARGETS DURING VEHICLE RADAR SYSTEM SERVICE PROCEDURES

(71) Applicant: Hunter Engineering Company, Bridgeton, MO (US)

(72) Inventors: Brian M. Cejka, Des Peres, MO (US); Daniel R. Dorrance, Ballwin, MO (US); Nicholas J. Colarelli, III, Frontenac, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 342 days.

(21) Appl. No.: 16/656,357

(22) Filed: Oct. 17, 2019

(65) Prior Publication Data

US 2020/0150224 A1     May 14, 2020

Related U.S. Application Data

(60) Provisional application No. 62/759,240, filed on Nov. 12, 2018.

(51) Int. Cl.
    *G01S 7/40*      (2006.01)
    *G01S 13/931*    (2020.01)
    *H01Q 1/32*      (2006.01)
    *H01Q 19/10*     (2006.01)

(52) U.S. Cl.
    CPC .............. *G01S 7/40* (2013.01); *G01S 7/4026* (2013.01); *G01S 13/931* (2013.01); *H01Q 1/3233* (2013.01); *H01Q 19/106* (2013.01); *G01S 7/403* (2021.05)

(58) Field of Classification Search
    CPC ........ H01Q 15/18; H01Q 19/106; G01S 7/40; G01S 7/4026–7/4034; G01S 7/4082; G01S 7/4086; G01S 13/931
    See application file for complete search history.

(56) References Cited

U.S. PATENT DOCUMENTS

| | | | |
|---|---|---|---|
| 4,233,605 A | 11/1980 | Coleman | |
| 4,560,987 A * | 12/1985 | Dochow | G01S 7/4052 342/171 |
| 4,947,175 A * | 8/1990 | Overholser | G01S 7/4052 342/165 |

(Continued)

FOREIGN PATENT DOCUMENTS

| | | |
|---|---|---|
| EP | 1111714 B1 | 7/2004 |
| EP | 3180636 B1 | 5/2019 |
| WO | 2016025683 A1 | 2/2016 |

*Primary Examiner* — Peter M Bythrow
(74) *Attorney, Agent, or Firm* — Sandberg Phoenix & von Gontard, P.C.

(57) ABSTRACT

Calibration targets for use during calibration and inspection of vehicle onboard radar systems. The calibration targets incorporate materials having different radar reflective and transmissive properties to provide distinct radar return signatures, facilitating identification of the calibration targets from among various radar returns associated with surfaces and objects located in proximity to the calibration targets, thereby reducing clear space requirements associated with target placement and positioning during a vehicle service or inspection procedure.

10 Claims, 10 Drawing Sheets

(56) References Cited

U.S. PATENT DOCUMENTS

| | | | | |
|---|---|---|---|---|
| 5,892,479 | A * | 4/1999 | Mills | G01S 7/4052 342/172 |
| 6,020,844 | A * | 2/2000 | Bai | G01S 7/4026 342/165 |
| 6,087,995 | A * | 7/2000 | Grace | G01S 7/4017 343/703 |
| 6,363,619 | B1 * | 4/2002 | Schirmer | G01B 11/27 33/288 |
| 6,498,959 | B1 * | 12/2002 | January | G01B 11/00 33/227 |
| 6,636,172 | B1 * | 10/2003 | Prestl | G01S 7/4026 342/173 |
| 6,692,707 | B1 | 2/2004 | Hirabayashi et al. | |
| 6,778,131 | B2 * | 8/2004 | Haney | G01S 7/4026 342/174 |
| 6,809,806 | B1 * | 10/2004 | Carnevale | G01S 7/4026 356/141.2 |
| 6,933,883 | B2 * | 8/2005 | Isaji | G01S 13/931 342/174 |
| 7,079,073 | B2 * | 7/2006 | Fujita | G01S 7/4026 342/174 |
| 8,692,707 | B2 * | 4/2014 | Lee | G01S 7/4004 342/174 |
| 8,786,502 | B2 * | 7/2014 | Ho | G01R 31/002 343/703 |
| 9,170,101 | B2 * | 10/2015 | Stieff | G01S 13/931 |
| 9,348,017 | B2 * | 5/2016 | Steinlechner | G01S 13/931 |
| 9,645,051 | B2 * | 5/2017 | Jin | G01M 17/007 |
| 10,323,936 | B2 * | 6/2019 | Leikert | G01B 11/2755 |
| 10,458,811 | B2 * | 10/2019 | Voeller | G01S 17/931 |
| 10,473,759 | B2 * | 11/2019 | Bilik | G01S 13/878 |
| 10,585,170 | B2 * | 3/2020 | Hellinger | G01S 7/4052 |
| 10,705,187 | B1 * | 7/2020 | Hebert | F41J 9/08 |
| 10,921,426 | B2 * | 2/2021 | Tang | G01S 7/40 |
| 11,112,490 | B2 * | 9/2021 | Vu | G01S 13/867 |
| 2002/0105456 | A1 * | 8/2002 | Isaji | G01S 13/931 342/165 |
| 2003/0090411 | A1 * | 5/2003 | Haney | G01S 7/4026 342/165 |
| 2004/0003951 | A1 * | 1/2004 | Kikuchi | G01S 7/4052 180/169 |
| 2004/0017308 | A1 * | 1/2004 | Kikuchi | G01S 7/4026 342/74 |
| 2004/0165174 | A1 * | 8/2004 | Knoedler | G01M 11/067 356/4.01 |
| 2006/0164295 | A1 * | 7/2006 | Focke | G01S 7/4026 342/174 |
| 2008/0147274 | A1 * | 6/2008 | Ko | G01S 13/878 701/41 |
| 2011/0077900 | A1 * | 3/2011 | Corghi | G01B 11/2755 702/150 |
| 2013/0110314 | A1 * | 5/2013 | Stieff | G01S 13/931 701/1 |
| 2013/0325252 | A1 * | 12/2013 | Schommer | G01S 7/52004 701/33.1 |
| 2014/0233023 | A1 * | 8/2014 | Soininen | G01S 13/867 356/138 |
| 2014/0300519 | A1 * | 10/2014 | Estebe | G01S 7/4026 343/703 |
| 2014/0347206 | A1 * | 11/2014 | Steinlechner | G01S 13/931 342/5 |
| 2015/0134191 | A1 * | 5/2015 | Kim | G01M 17/007 701/29.7 |
| 2017/0003141 | A1 * | 1/2017 | Voeller | G01S 17/931 |
| 2017/0212215 | A1 * | 7/2017 | Hellinger | G01S 13/931 |
| 2018/0052223 | A1 * | 2/2018 | Stieff | G05D 1/0231 |
| 2019/0187249 | A1 * | 6/2019 | Harmer | G01B 11/272 |
| 2020/0142027 | A1 * | 5/2020 | Lee | G01S 7/4086 |

* cited by examiner

Figure 9
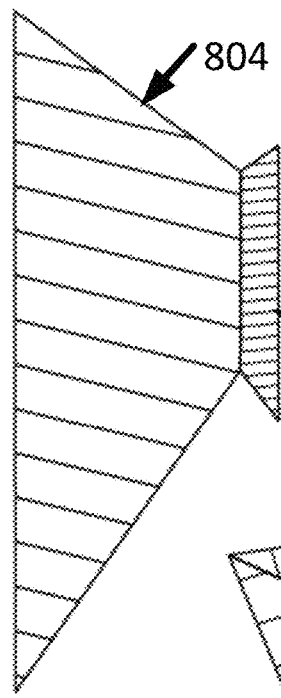
Figure 10
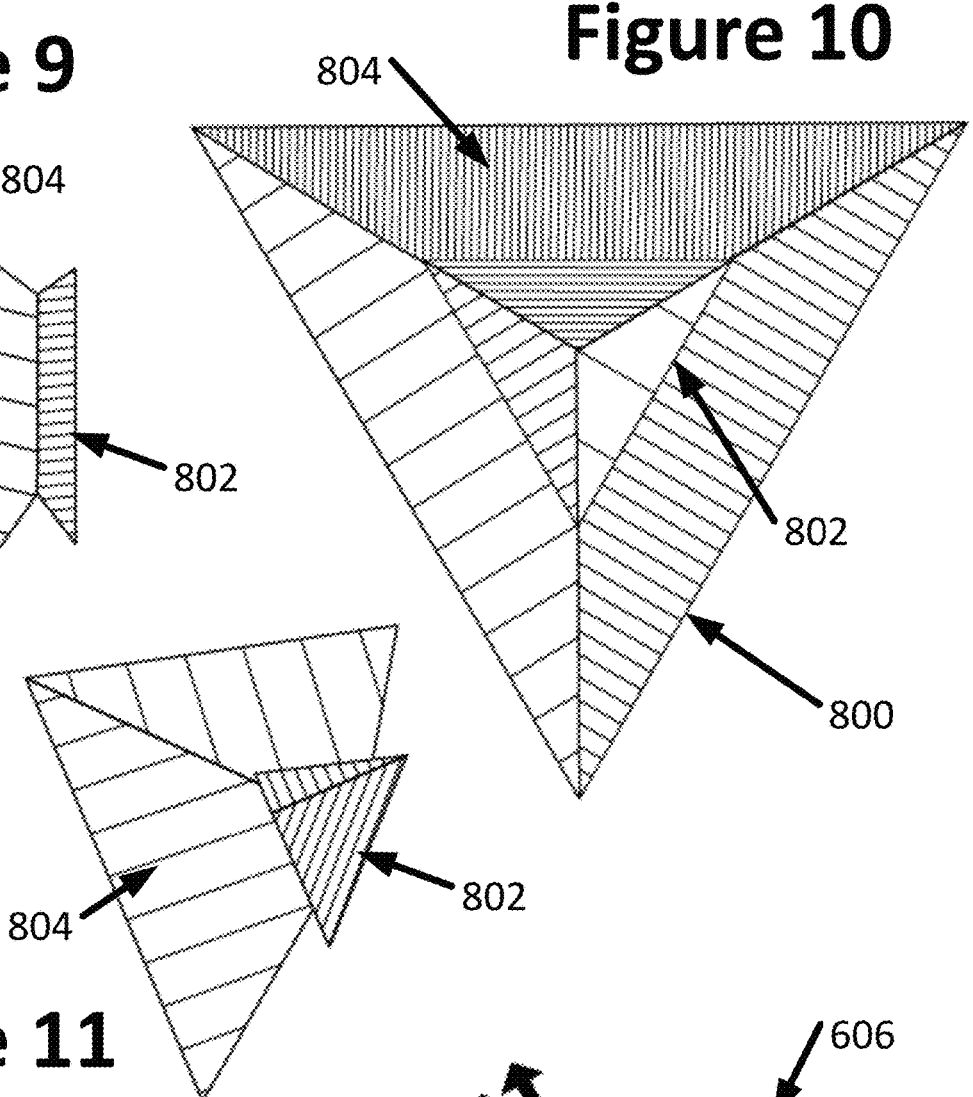
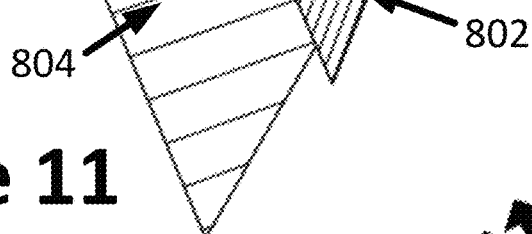
Figure 11
Figure 12
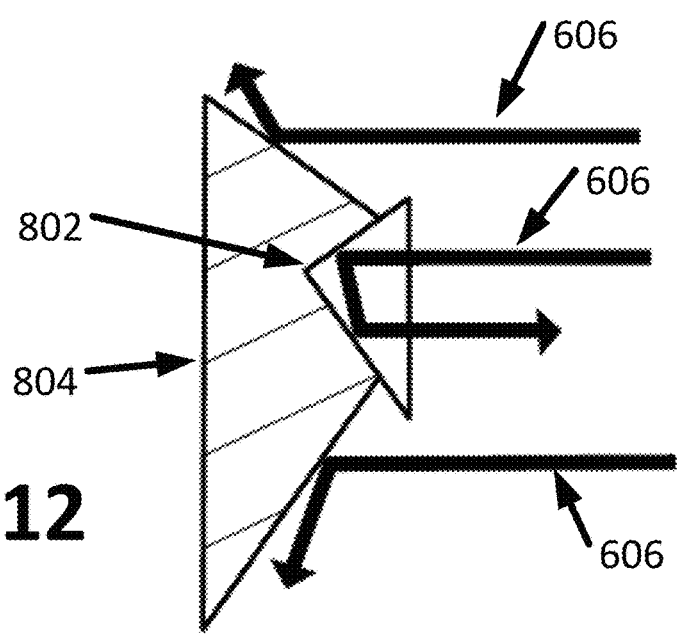

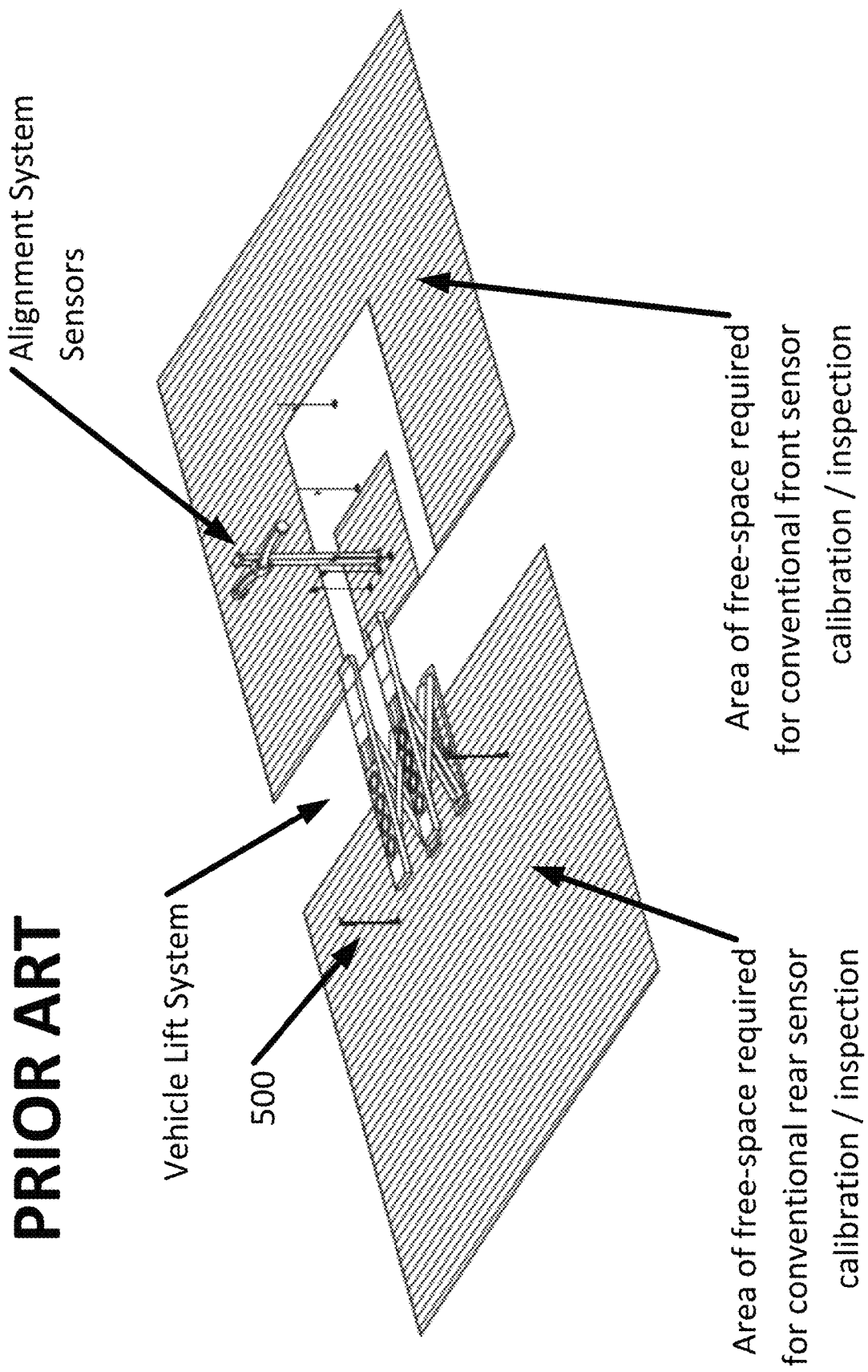

METHOD AND APPARATUS FOR IDENTIFICATION OF CALIBRATION TARGETS DURING VEHICLE RADAR SYSTEM SERVICE PROCEDURES

CROSS-REFERENCE TO RELATED APPLICATIONS

The present application is related to, and claims priority from, U.S. Provisional Patent Application Ser. No. 62/759,240 filed on Nov. 12, 2018, and which is herein incorporated by reference.

STATEMENT REGARDING FEDERALLY SPONSORED RESEARCH

Not Applicable.

BACKGROUND OF THE INVENTION

The present application is related generally to method and apparatus used to facilitate alignment of vehicle onboard radar sensors for monitoring the environment around the vehicle, and in particular to method and apparatus for identifying and distinguishing radar calibration targets located in close proximity to the vehicle during a vehicle radar system service procedure from radar-reflective background objects.

Modern vehicles are becoming increasingly sophisticated with the addition of various sensors and systems configured to monitor the external environment around the vehicle. A wide variety of sensors, including acoustic, optical, infrared, and radar are employed by onboard vehicle systems such as backup alarms, collision avoidance systems, brake assist system, lane departure warning systems, cross-traffic warning systems, park assist systems, and blind spot monitoring systems. In extreme vehicle applications, multiple systems may be integrated together to enable autonomous driving of the vehicle. In order for these various systems to function, it is necessary to ensure that the onboard sensors which acquire data regarding objects in the surrounding environment are aligned to specific predetermined or known orientations relative to the vehicle. If a sensor is misaligned, the resulting data acquired from that sensor may not properly detect the presence of an object adjacent to or approaching the vehicle, or may not properly identify the location of that object, leading to situations in which warnings are not provided when they should have been, or situations in which warnings are provided in error. Failure of such an onboard vehicle system to properly detect and locate objects in the vicinity of the moving vehicle could lead to collisions between the vehicle and the object.

Accordingly, automotive manufacturers have established specific requirements for alignment of the various onboard sensors which monitor the vehicle external environment. These requirements often require the placement of observable or reflective targets at precise locations relative to an identifiable or measured point on the vehicle. With the targets properly positioned, the various onboard sensors are then aligned or calibrated with reference to the observable or reflective targets.

For example, many new vehicle models are equipped with radar devices which are concealed in inconspicuous locations, such as behind the front or rear bumper covers, through which emitted and reflected radar waves pass. The procedures for alignment, calibration, and/or inspection of the radar devices vary from vehicle to vehicle and from manufacturer to manufacturer, due to the wide range of different types of radar devices entering the market. In order to perform an aiming or calibration procedure for the radar devices, manufacturers generally require the vehicle be positioned on a level surface such as a vehicle lift rack. A trihedral retro-reflective aiming or radar calibration target 500 for each radar device is placed at a specified distance from the vehicle along a specified axis. The distance and specified axis varies depending on the vehicle model, and may be referenced to a feature of the vehicle, such as the location of the vehicle body centerline. Often, the manufacturer's specified distance necessitates placement of the radar calibration target at a location which is outside the bounds of a typical vehicle service bay, and in a free-space area devoid of other radar reflective surfaces, such as shown in FIG. 16, necessitating special arrangements and locations within a vehicle service shop for conducting the service or inspection of vehicle onboard radar sensors.

Accordingly, it would be advantageous to provide a radar target or calibration fixture for use in the alignment, calibration, and inspection of range-finding onboard vehicle sensors which can be used within the close confines of a typical vehicle service area, including in close proximity to other radar reflective surfaces or backgrounds.

BRIEF SUMMARY OF THE INVENTION

In one embodiment, the present disclosure sets forth a method for utilizing a radar reflective target within the confines of a vehicle service area during a vehicle onboard radar sensor service procedure. Initially, a radar target structure is disposed within a field of view of the vehicle onboard radar sensor, which is then activated to generate an output representative of the observed field of view. The output of the vehicle onboard radar sensor is communicated to a processing system configured with software instructions for evaluation to differentiate the radar target structure from other radar-reflective surfaces visible to the vehicle onboard radar sensor within the field of view. During the evaluation, the radar target structure is differentiated from other radar-reflective surfaces by identifying an occurrence of a unique radar signature of the radar target structure within the observed field of view.

In another embodiment, the present disclosure sets forth an inspection system for conducting an inspection of a vehicle onboard radar sensor. The inspection system includes a processing system configured with software instructions to guide an operator through at least one of a calibration procedure, an inspection procedure, or an alignment procedure associated with a vehicle onboard radar sensor, wherein the procedure requires the radar sensor to detect a radar-observable target in proximity to the vehicle. The system further includes a radar-observable target for placement in proximity to the vehicle. The radar-observable target presents a unique radar signature consisting of a boundary region defined by a first radar return signal, and at least one sub-region contained within the boundary region and defined by a second radar return signal distinguishable from the first radar return signal. The boundary region and the at least one sub-region are configured to facilitate detection of the radar-observable target by the vehicle onboard radar sensor when the radar-observable target is in close spatial proximity to background radar reflective surfaces such as may be associated with an automotive service environment.

In a further embodiment, the present disclosure sets forth a vehicle onboard radar system calibration target structure.

The target structure consists of a support structure carrying at least a first surface and a second surface. The first surface provides a region having a first radar reflectivity characteristic, while the second surface provides a region having a second radar reflectivity characteristic which is selected to be distinct from the first radar reflectivity characteristic. The support structure secured the first and second surfaces in a fixed spatial arrangement visible to the vehicle onboard radar system.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 9 is a side plane view of an alternative radar target of the present disclosure, incorporating a radar retro-reflective target disposed within a radar dispersing border structure;

FIG. 10 is a front plan view of the target of FIG. 9;

FIG. 11 is a front perspective view of the target of FIG. 9;

FIG. 12 is a cross-sectional view of the target of FIGS. 9-11, illustrating the interaction of radar emissions with the various target surfaces;

FIG. 16 is a perspective view of the free-space requirements for utilizing a prior art radar target during a vehicle onboard radar system calibration or inspection procedure.

Corresponding reference numerals indicate corresponding parts throughout the several figures of the drawings. It is to be understood that the drawings are for illustrating the concepts set forth in the present disclosure and are not to scale.

Figure 1:
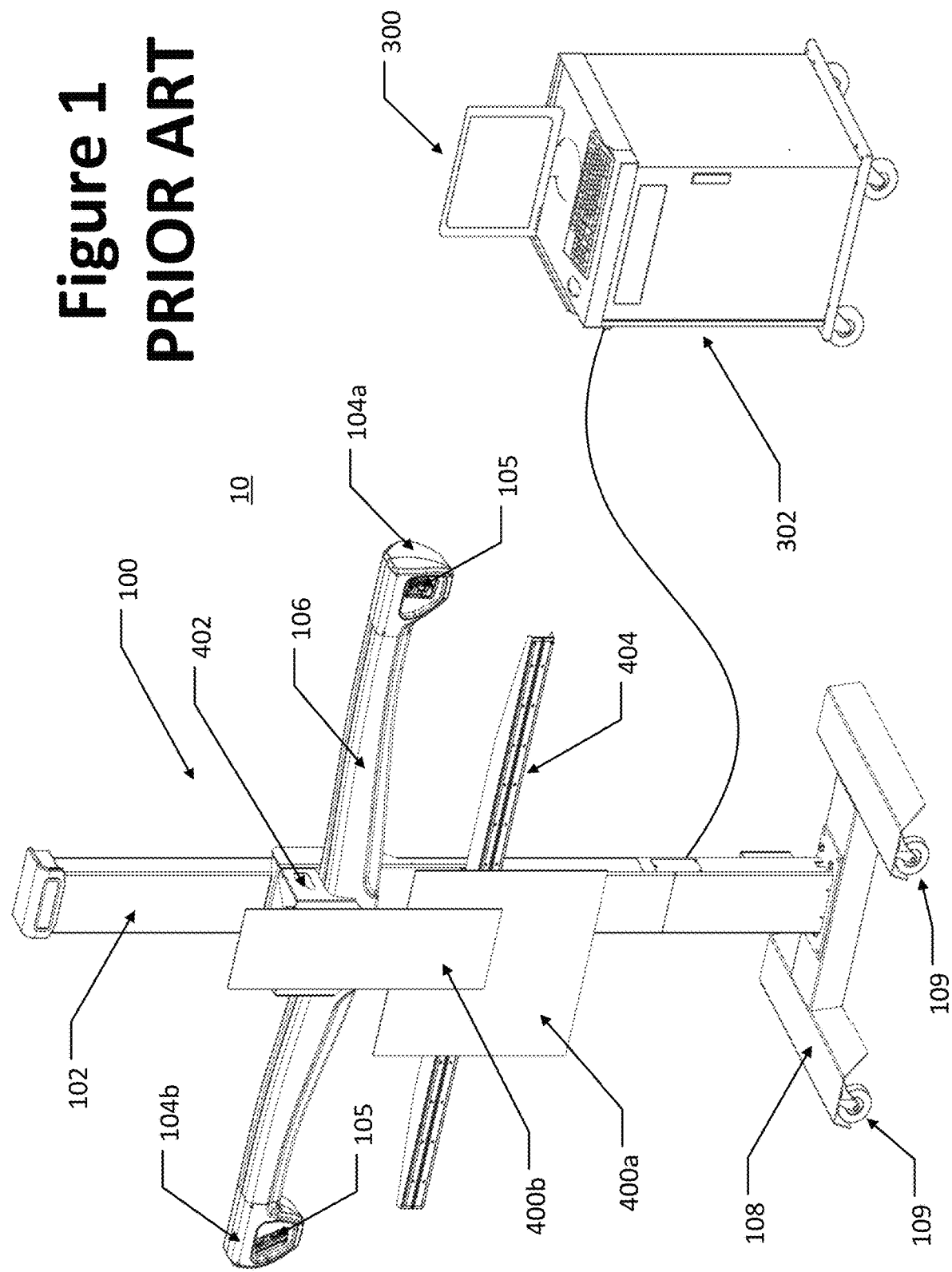
FIG. 1 is a representation of a prior art vehicle alignment measurement system and vehicle ADAS calibration structure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
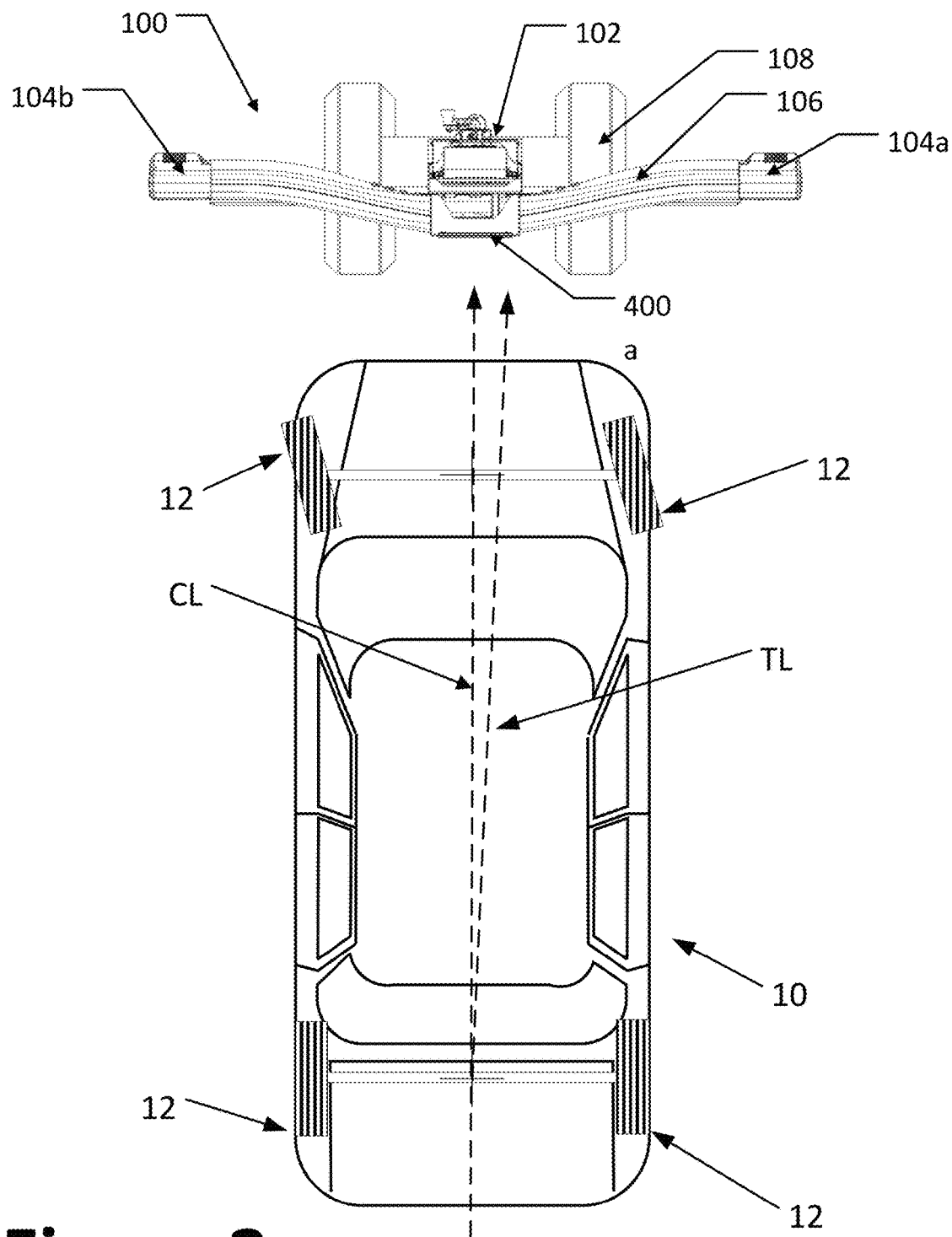
FIG. 2 is an illustration of the placement of the prior art system of FIG. 1 relative to a vehicle undergoing an ADAS system calibration or inspection.

Turning to the figures, and to FIGS. 1 and 2 in particular, a prior art vehicle measurement system instrumentation fixture or support structure 100 is shown, having a vertical column 102 for positioning in forward proximity to a vehicle undergoing service. The column 102 supports a set of laterally spaced camera modules 104a, 104b associated with a vehicle measurement system, such as a vehicle wheel alignment or inspection system, together with at least one vehicle calibration assistance structure, consisting of a specialized target structure 400a, 400b utilized to facilitate a process for realigning or recalibrating one or more safety system radar sensors onboard a vehicle 10 undergoing a service procedure.

On the support structure 100, a camera crossbeam 106 carried by the vertical column 102 locates the set of laterally spaced camera modules 104a, 104b adjacent opposite longitudinal ends. Each camera modules includes one or more cameras 105, with fields of view oriented as required to view along a corresponding lateral side of the vehicle 10 undergoing service. The camera crossbeam 106 is optionally vertically (and/or rotationally) adjustable relative to the vertical column 102 to permit adjustments to accommodate elevation changes of the vehicle, resulting from movement of an adjustable lift rack (not shown) on which the vehicle is positioned. Vertical adjustments to the camera crossbeam 106 may be by any conventional means, such as sliding rails, rod and screw mechanisms, pulley mechanism, counterweights, etc. The mechanism for vertical adjustments can be manually actuated, or driven by a suitable motor under either operator manual control or automatic software control. Rotational adjustments of the camera crossbeam about a longitudinal axis, if provided for, may be by any conventional means, manually actuated, or driven by a suitable motor either under manual control of an operator or under automatic software control. As an alternative to rotationally adjusting the camera crossbeam 106, individual camera modules 104a, 104b are configured with coupling mechanisms to permit multi-axis independent movement to achieve desired fields of view with each camera 105.

It will be recognized that while the embodiments of the vehicle measurement system instrumentation structure illustrated in the figures and described above utilize a vertical column 102 and a camera crossbeam 106, other configurations of a camera support structure 100 may be utilized without departing from the scope of the present invention. For example, in place of the vertical column 102 and camera crossbeam 106, a camera support structure 100 may consist of articulated camera support arms configured to position individual cameras in spaced arrangements to achieve the fields of view necessary to observe features or targets associated with a vehicle undergoing a wheel alignment service, measurement, or inspection.

The camera modules 104a, 104b are operatively coupled to a processing system 300, disposed in an associated console 302 in proximity to the fixture or support structure 100. The processing system 300 is configured with suitable logic circuit components and with software instructions for receiving image data from the camera modules 104a, 104b, evaluating the image data to identify relative spatial positions of observed surfaces, such as optical targets disposed on the wheels 12 or surfaces of a vehicle 10, and for computing associated vehicle characteristics, such as wheel alignment angles or vehicle body position. The processing system 300 is further configured to determine the spatial position of one or more observed surfaces associated with the vehicle relative to the support structure 100, thereby enabling positioning of the support structure, and hence the target structures 400a, 400b, relative to the vehicle, such as on the vehicle centerline axis. It will be understood that the configuration of the processing system 300, camera modules 104a, 104b, and console 302 are known in the art of machine vision vehicle wheel alignment systems, and variations from the specific configuration described herein are possible without departing from the scope of the invention.

To facilitate alignment and calibration of safety system sensors onboard a vehicle, each target structure 400a, 400b includes an observable target face oriented in a forward direction from the fixture or support structure 100 (i.e., towards the vehicle service area), at an elevation necessary for observation by the safety system sensors onboard the vehicle 10 during a realignment or recalibration procedure. The specific configuration of the target structures 400a, 400b, such as the target face features, is related to, and will vary with, the specific type of safety system sensor for which it is intended be used. For example, a metallic or radar-reflective target 400b is provided for use with radar-based safety system sensors.

The mounting fixture 402 in one embodiment is a fixed mount which secures the target structures 400a, 400b in a fixed position and orientation relative to the vertical column 102. In an alternative embodiment, the mounting fixture 402 includes one or more mechanisms for adjusting a lateral position, a vertical position, and/or an orientation of the target structures 400a, 400b over a limited range relative to the vertical column 102. Position and/or orientation adjustments of the target structures 400a, 400b, are required for use with vehicle safety system sensors offset from a vehicle centerline CL, or thrust line TL on which the fixture or support structure 100 is disposed, as seen in FIG. 2. An exemplary adjustment mechanism consists of a lateral support track 404 coupled to the mounting fixture 402, parallel to the camera crossbeam 106 supporting a target structure for sliding movement, thereby enabling lateral position adjustment of a target structure 400a.

In one embodiment, to facilitate positioning of the fixture or support structure 100 generally at the vehicle centerline CL and to enable the set of camera modules 104a, 104b to view features on each lateral side of the vehicle 10, the fixture or support structure 100 is provided with a base structure 108 having a set of rolling elements, such as casters or wheels 109. During use, the fixture or support structure 100 is rolled into a vehicle-specific position at a selected distance from the front of the lift rack or support surface on which the vehicle 10 is disposed during the measurement, inspection, or wheel alignment service procedure. Different vehicles may require the fixture or support structure 100 to be positioned at different locations relative to the vehicle.

Precise position of the fixture or support structure 100 to place the target structure 400 in a required location for use is, in an alternative embodiment, carried out under the guidance of the processing system 300 in response to data acquired through the processing of images acquired by the camera modules 104a, 104b. For example, with the fixture or support structure 100 positioned generally on the centerline CL of a vehicle 10 as seen in FIG. 2, the camera modules 104a, 104b acquire images associated with the front and rear wheels 12 on each lateral side of the vehicle, from which the processing system 300 identifies a position of the fixture or support structure relative to either a geometric centerline CL or a thrust line TL of the vehicle 10. If adjustments to the position of the fixture or support structure 100 relative to either the vehicle's geometric centerline CL or thrust line TL are required, guidance is provided to the operator by the processing system 300 based on the determined relative position of the fixture or support structure. The guidance may be in any of a variety of formats, such numerical (i.e., 2" to the left), symbolic (i.e., an indication arrow and/or sliding bar graph), or audible (i.e., a tone or sound when the correct position is reached). The guidance may be static guidance, in which no updates to the position data are acquired until the fixture or support structure is stationary, or alternatively, the guidance may be dynamic, in which the processing system 300 receives images from the camera modules 104a, 104b during movement of the fixture or support structure, and provides sequentially updated or "live" instructions to the operator to aid in precise positioning of the fixture or support structure relative to the vehicle 10.

It will be recognized that automated positioning of the fixture or support structure 100 in an alternative embodiment, is possible under control of the processing system 300 via commands to drive mechanisms, such as stepper motors, for driving the rolling elements or other means of machine controlled locomotion.

In one embodiment, positioning of the fixture or support structure 100 is along a single axis transverse to the vehicle centerline CL (i.e., from side to side). In alternate embodiments, positioned is further carried out along a second axis parallel to the vehicle centerline CL (i.e., towards or away from the vehicle). In further variations of either embodiment, a vertical height of the set of the camera modules 104a, 104b is adjustable by raising or lowering the camera crossbeam 106 along the vertical column 102.

Once the fixture or support structure is positioned at a desired location relative to the vehicle 10, adjustments to the position and/or orientation of the target structure 400a, 400b relative to the vertical column 102 for proper placement within a field of view of the onboard vehicle safety system sensors are made via the mounting fixture 402. Suitable adjustment mechanisms within the mounting fixture 402 include, but are not limited to, ball and socket connections, pivot arms, and the sliding rail or track 404. With the target structure 400a, 400b positioned at the desired location relative to the vehicle, and more specifically, relative to an onboard vehicle sensor, measurement, alignment, or calibration of the onboard vehicle sensor can proceed as understood in the art, by observing or illuminating the target structure 400 and responding accordingly.

Figure 3:
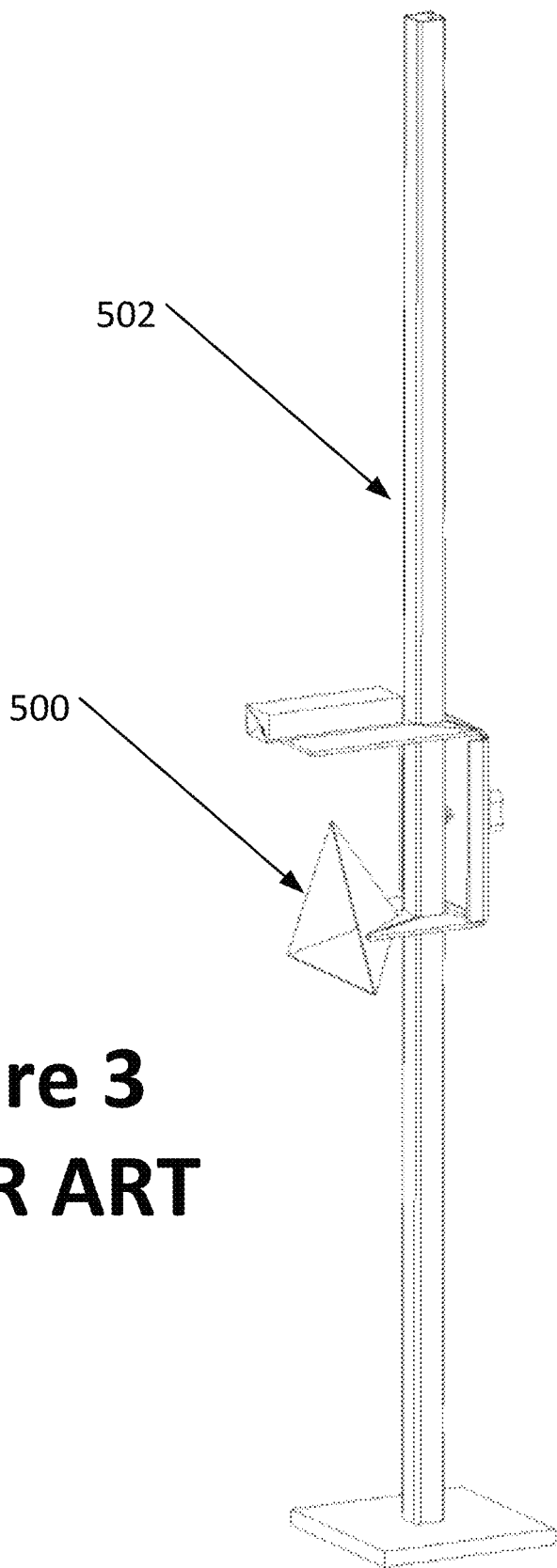
FIG. 3 is a perspective illustration of a prior art radar retro-reflective target consisting of a trihedral retro-reflector mounted to a support stand.

As an alternative to the complex calibration fixture or support structure 100 shown in FIGS. 1 and 2, some onboard vehicle sensors may be inspected, calibrated, or aligned utilizing retro-reflective radar targets 500 such as shown in FIG. 3, mounted on an adjustable support 502. However, use of radar targets 500 requires placement of the target 500 relative to the vehicle undergoing service, in an area which is free from other radar-reflective surfaces, thereby enabling the vehicle onboard radar sensor to observe and identify the target 500 within an associated field of view. During inspection or calibration, the onboard vehicle radar sensor is activated to transmit radar energy into a field of view towards the target 500. A receiver component of the vehicle onboard radar sensor receives reflected radar energy from surfaces within the field of view, including the target 500, detecting the locations and distances of the surfaces and providing the information to an associated electronic control unit. The location and distance data is conveyed to a processing system which identifies the observed surface corresponding to target 500, and evaluates the associated location and distance information for comparison to diagnostic data.

Figure 4A:
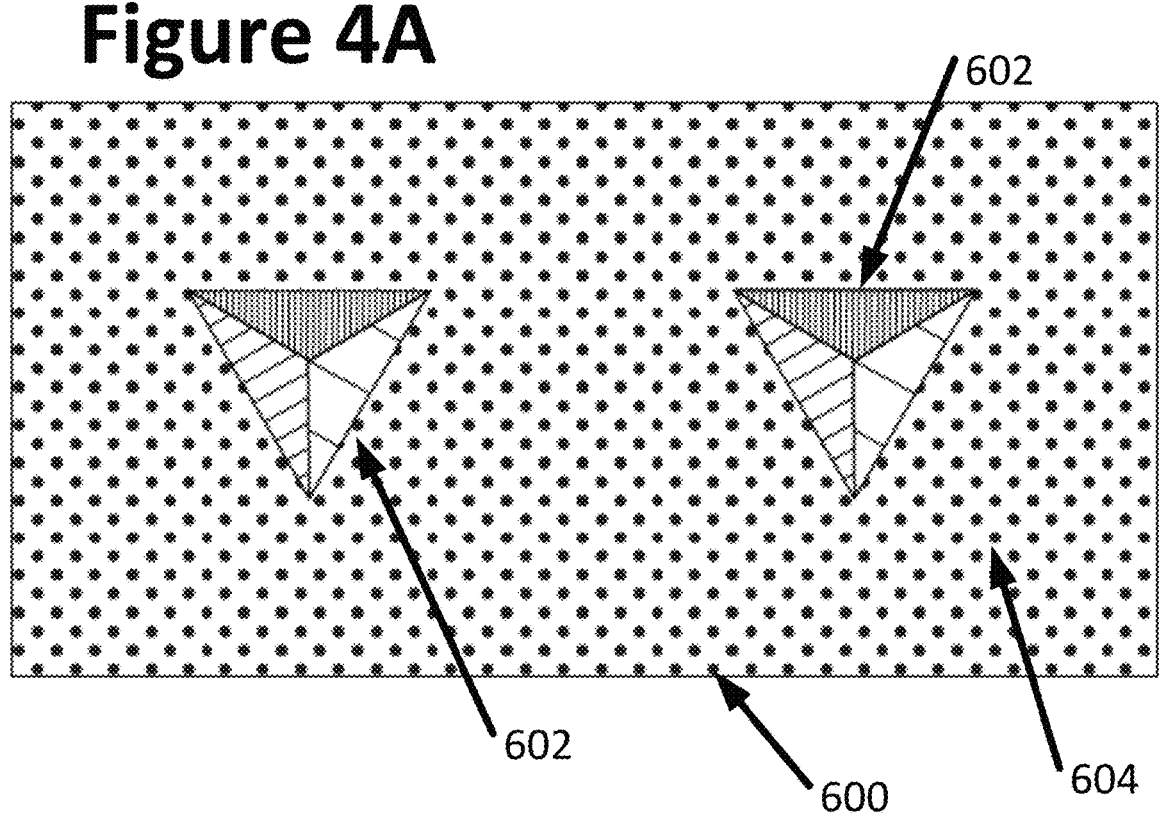
FIG. 4A is a front view of a radar retro-reflective target of the present disclosure, incorporating a pair of spaced retro-reflective structures supported within a radar-transparent substrate.
Figure 5:
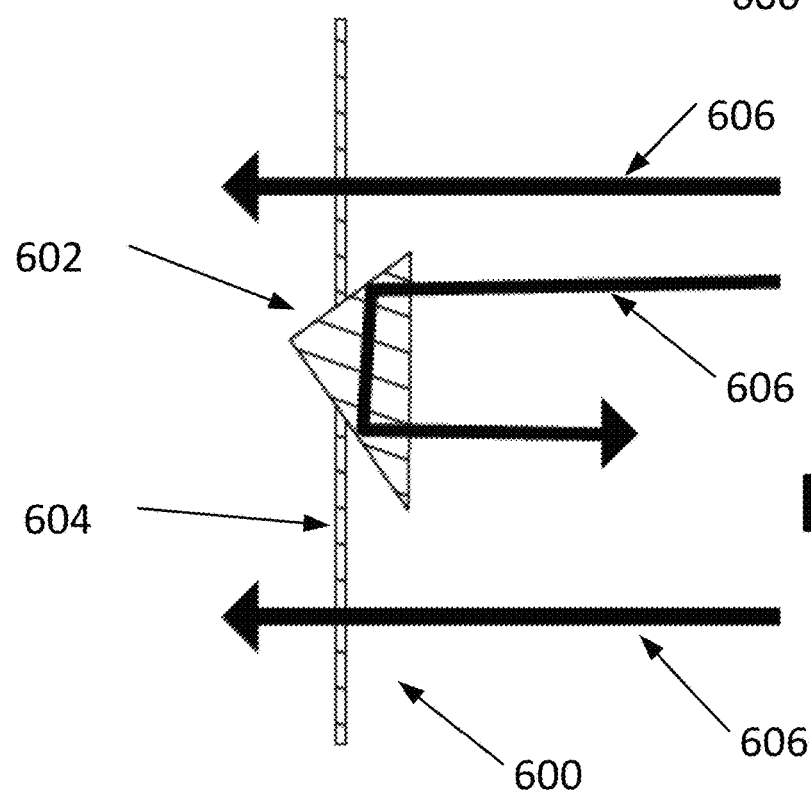
FIG. 5 is a cross-sectional view of the target of FIG. 4A, illustrating the interaction of radar emissions with the target surfaces.
Figure 4B:
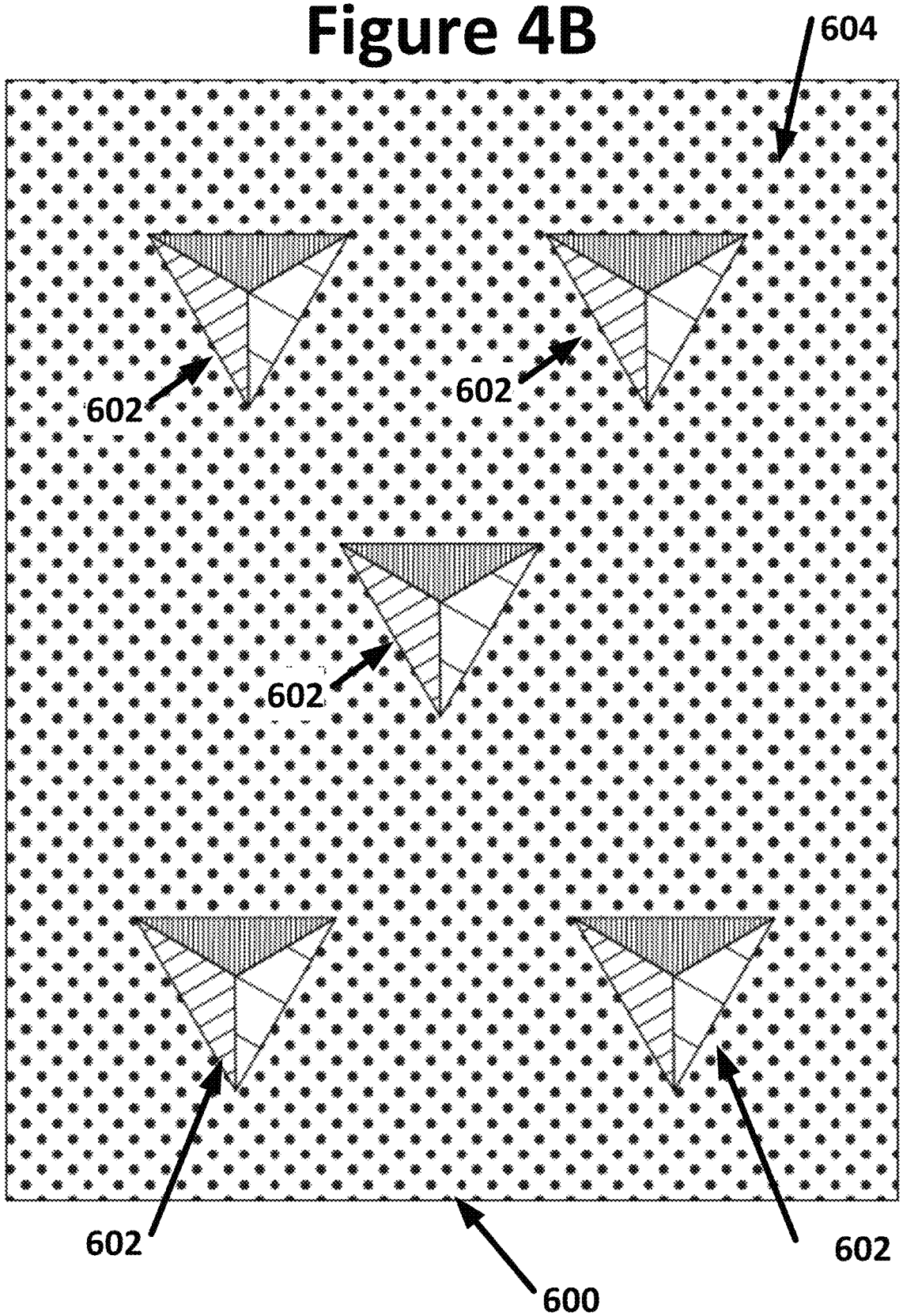
FIG. 4B is a front view of a variation of the radar retro-reflective target of FIG. 4a incorporating additional spaced retro-reflective structures supported within the radar-transparent substrate.

Turning to FIGS. 4A, 4B, and 5, a first embodiment of a retro-reflective radar target structure 600 of the present disclosure is illustrated for use on a suitable stand or fixture (not shown). The target 600 is consists of two (FIG. 4A) or more (FIG. 4B) radar retro-reflective target elements or surfaces 602 supported within a radar transparent support structure 604. As shown in FIG. 5, the target elements or surfaces 602 reflect incoming radar energy 606 to provide strong radar returns to an observing radar system, while the support structure 604 is generally invisible to the observing radar system. The target elements or surfaces 602 supported by the structure 604 are disposed in a known or determinable relationship to each other, such that the observing radar system can distinguish the target 600 from background clutter or other radar return signals by detecting and recognizing the spatial arrangement of the strong radar returns generated by the target elements or surfaces 602, and the absence of radar return from the surrounding support structure 604. For example, as seen in FIG. 4B, multiple target elements or surfaces 602 supported in a spaced arrangement within a planar support structure 604 present a pattern of strong radar returns to an observing radar system, indicating the presence of the target elements or surfaces 602 arranged as shown in the plane of the support structure 604. By providing multiple target elements or surfaces 602 in a spatial arrangement, such as a common plane as seen in FIGS. 4A and 4B, a vehicle onboard radar system can distinguish the target 600 from other random radar reflective surfaces within a given field of view, thereby reducing the "clear space" requirements often specified by vehicle manufacturers for the placement of radar system calibration or reference targets.

Figure 6:
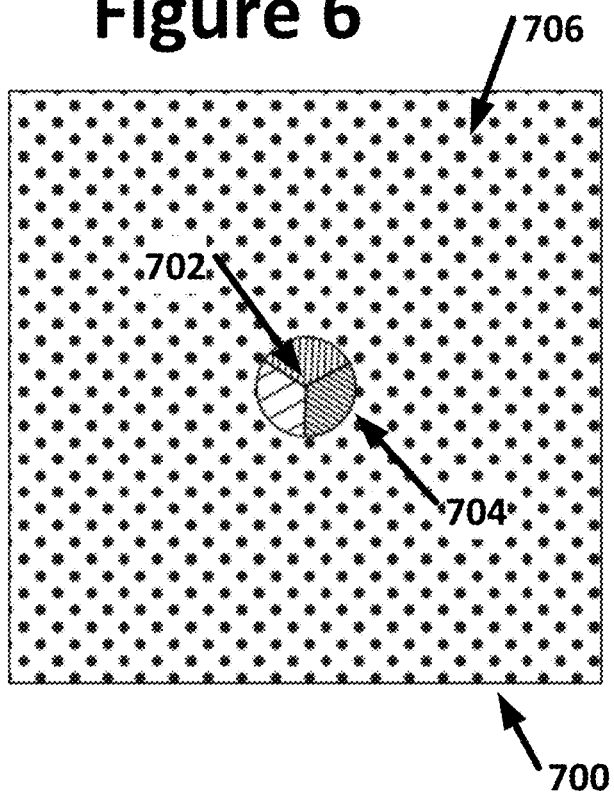
FIG. 6 is a front view of an alternative radar target of the present disclosure, incorporating a radar dispersing target behind an opening within a radar reflective plate.
Figure 7:
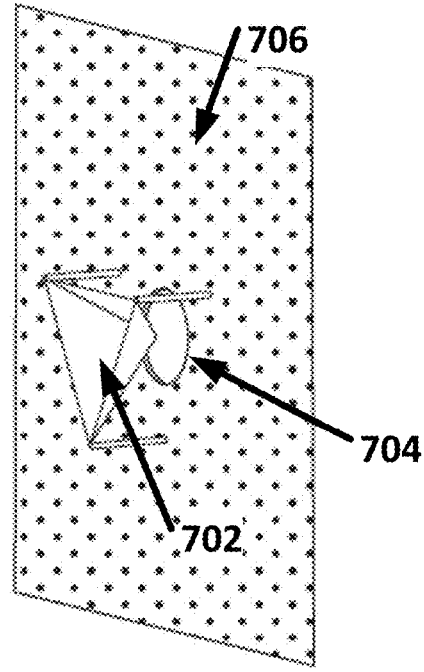
FIG. 7 is a perspective rear view of the target of FIG. 6.
Figure 8:
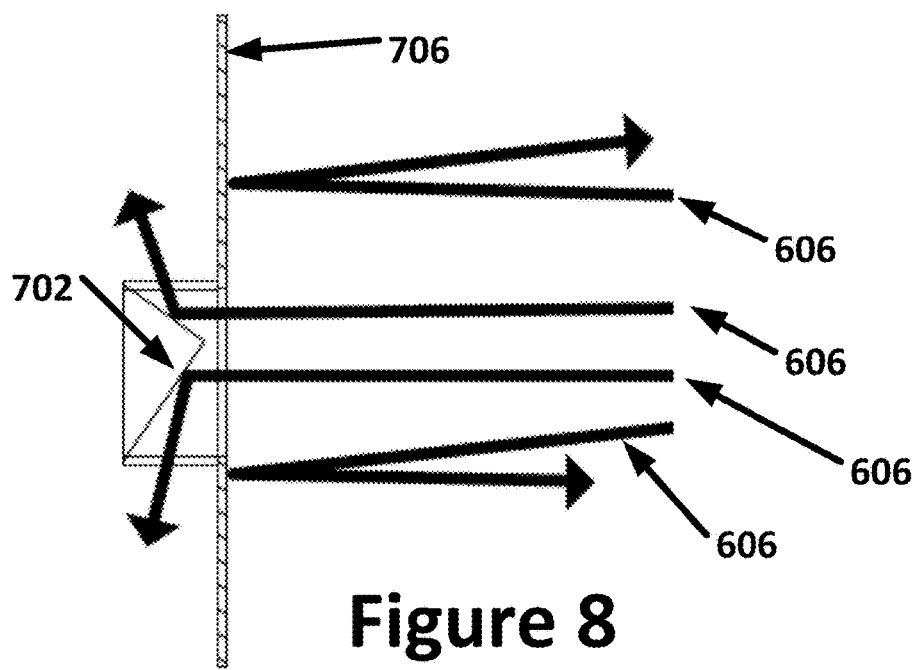
FIG. 8 is a cross-sectional view of the target of FIG. 6, illustrating the interaction of radar emissions with the target surfaces.

Turning to FIGS. 6-8, a second embodiment of a radar target structure 700 of the present disclosure is illustrated. The target 700 consists of at least one radar signal dispersing target element or surface 702 supported behind an associated opening 704 in a radar-reflective surface 706 such as a planar support structure. When illuminated by a radar source, the radar-reflective surface 706 reflects radar energy 606 so as to be visible to the vehicle onboard radar sensor. However, radar energy which passes through the opening 704, as shown in FIG. 8, is deflected by the target element or surface 702 in divergent directions away from the vehicle onboard radar sensor. Effectively, the observing vehicle onboard radar system registers the presence of the target 700 within a field of view as a reflective surface surrounding at least one non-reflective or "dark" region. Multiple openings 704 and associated target elements or surfaces 702 may be provided within the planar support structure 706 in a known or determinable relationship to each other, such that an observing vehicle onboard radar system distinguishes the target 700 from background clutter or other radar return signals by detecting and recognizing the spatial arrangement of the non-reflective or "dark" regions associated with by the target elements or surfaces 702.

Turning to FIGS. 9-12, a next embodiment of a radar target structure 800 of the present disclosure is illustrated. The radar target 800 consists of at least one retro-reflective radar target element 802 supported within a radar-dispersing or radar-deflecting support structure 804. When illuminated by a vehicle onboard radar source, the radar target element 802 reflects radar energy 606 so as to be visible to the vehicle onboard radar source, while the surrounding support structure 804 acts to deflect radar energy 606 in divergent directions away from the vehicle onboard radar source. Effectively, the observing vehicle onboard radar system registers the presence of the radar target structure 800 within a field of view as a highly reflective radar target element 802 surrounded by a non-reflective or "dark" region, i.e., the inverse of how the target structure 700 would appear. Multiple radar target elements 802 may be provided within the support structure 804 in a known or determinable relationship to each other, such that an observing onboard vehicle radar system can distinguish the radar target structure 800 from background clutter or other radar returns by detecting and recognizing the spatial arrangement of the highly reflective targets enclosed within a non-reflective or "dark" boundary.

Figure 13:
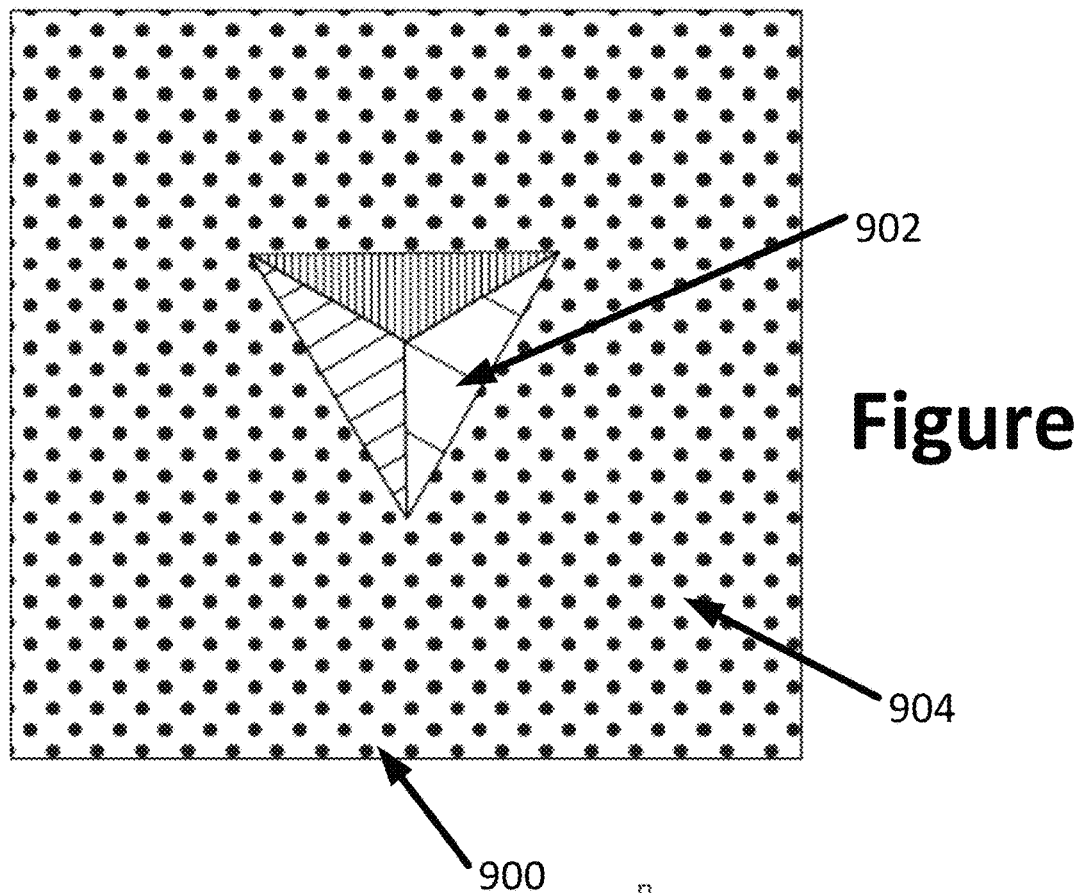
FIG. 13 is a front plan view of an alternative radar target of the present disclosure, incorporating a radar retro-reflective target supported within a radar absorbing border structure.
Figure 14:
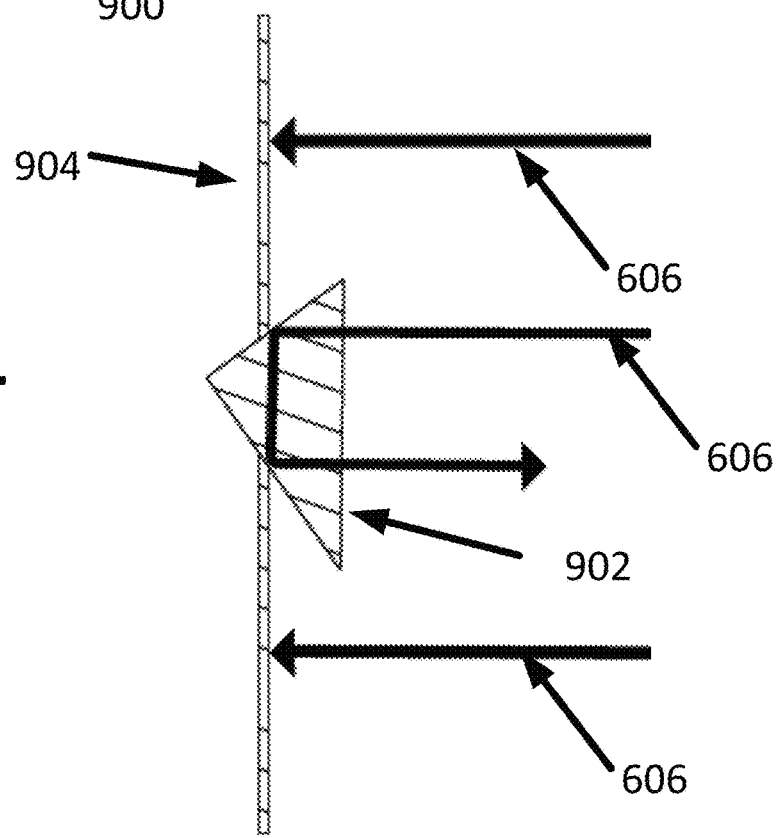
FIG. 14 is a cross-sectional view of the target of FIG. 13, illustrating the interaction of radar emissions with the various target surfaces.

A further variation on the radar target structure 800 of the present disclosure is illustrated at 900 in FIGS. 13 and 14. The radar target 900 consists of at least one retro-reflective radar target element or surface 902 supported within a radar absorbing surface 904, such as a planar support structure. When illuminated by a vehicle onboard radar source, the target element or surface 902 reflects radar energy 606 so as to be visible to the vehicle onboard radar source, while the surrounding surface 904 absorbs incoming radar energy 606. Effectively, the observing vehicle onboard radar system registers the presence of the radar target 900 within a field of view as a highly reflective target element 902 surrounded by a non-reflective or "dark" region, i.e., the inverse of how the radar target structure 700 would appear. Multiple target elements or surfaces 902 may be provided within the radar absorbing surface 904 in a known or determinable relationship to each other, such that an observing vehicle onboard radar system can distinguish the radar target 900 from background clutter or other radar return signals by detecting and recognizing the spatial arrangement of the highly reflective target elements 902 surrounded by a non-reflective or "dark" boundary region formed by the radar absorbing surface 904.

In each of the aforementioned embodiments, a unique and identifiable radar target is provided which consists of a combination of materials or surfaces having differing radar reflective, dispersive, transmissive, or absorbing properties to produce a recognizable radar reflection pattern or radar return. Providing a radar target having a unique and/or recognizable radar energy reflection pattern or radar return facilitates identification of the radar target in a field of view of a vehicle onboard radar system, even in the presence of other radar reflective surfaces such as may be found in an automotive service environment. This enables a radar target of the present disclosure to be utilized for vehicle onboard radar system calibration and/or inspection within a radar "cluttered" or "noisy" environment such as found in an automotive service shop, and reduces requirements for "clear space" in proximity to the radar targets. By reducing "clear space" requirements, the physical volume of space required to complete a vehicle onboard radar system calibration or inspection procedure is reduced, fitting within the confines of a vehicle service bay.

It will be recognized that in addition to, or in place of, different materials or surfaces having differing radar reflective, dispersive, transmissive, or absorbing properties, radar targets which can be uniquely identified or distinguished from background reflective surfaces may be constructed utilized dynamic components. For example, a rotating "fan" of radar reflective material may be utilized to provide a region of Doppler-shifted radar return. Such an active component may be further combined with supporting frameworks or structures consisting of radar deflecting or absorbing materials to produce a bounding region of limited or no radar return around the region of Doppler shifted radar return. In yet another embodiment, a radar waveguide structure may be utilized in combination with other radar reflective materials in a supporting target structure to produce a radar return having time-separated pulses from the same (or proximate) location.

Figure 15A:
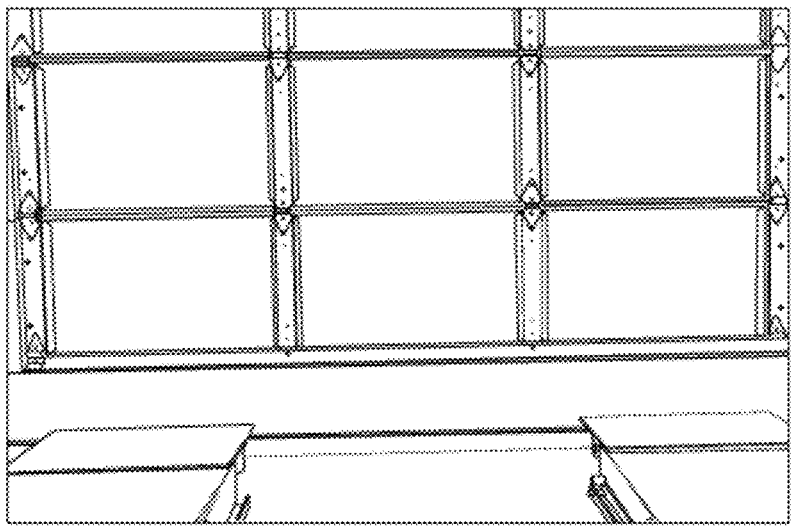
FIGS. 15A-15C illustrate a basic background subtraction process, in which a field of view is initially imaged without a target present (FIG. 15A), then with the target present (FIG. 15B), so as to utilize background subtraction to produce an image of just the target (FIG. 15C)
Figure 15B:
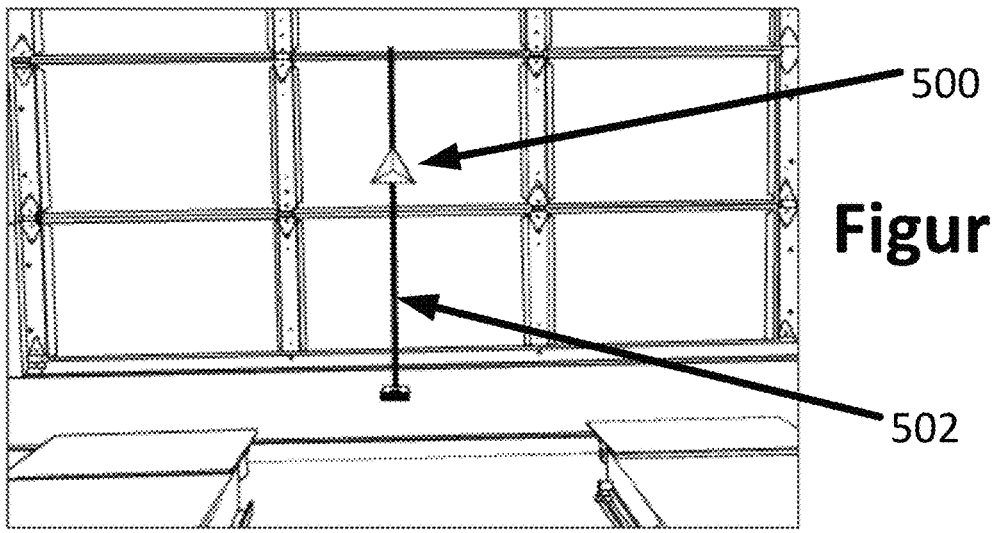
Figure 15C:
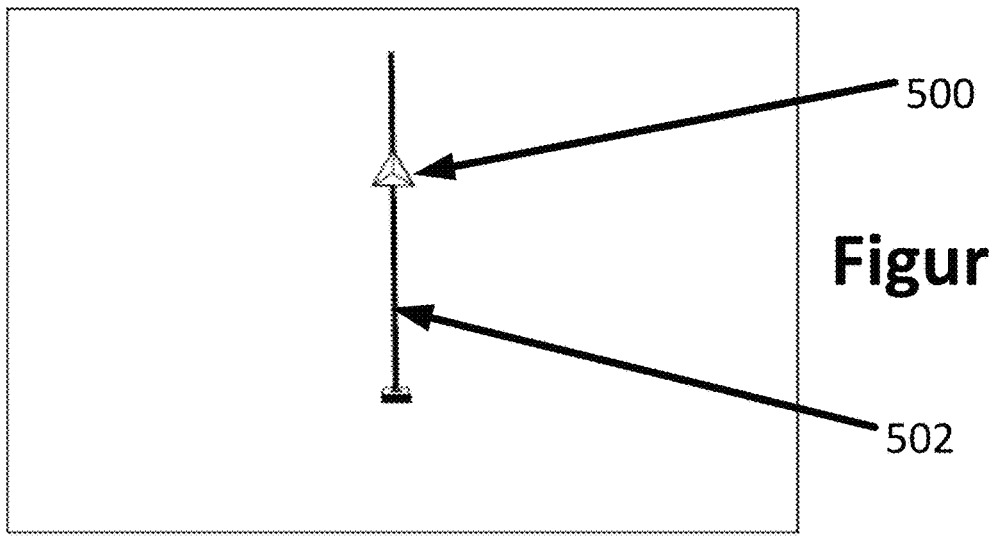

In a further embodiment of the present disclosure, a vehicle service or inspection system may be configured to utilize an image background subtraction technique to facilitate the identification of radar target objects within a field of view of a vehicle onboard radar sensor. For example, as shown in FIGS. 15A-15C, a field of view, such as shown in FIG. 15A may be observed by a vehicle onboard radar sensor system, and the static image or radar return recorded. A radar target 500 on an adjustable support 502 may then be placed within the field if view, as shown in FIG. 15B, and a second static image or radar return signal recorded. Utilizing a processing system programmed with conventional image and/or signal processing techniques, the common features observed in each image or radar return signal is digitally removed, leaving only those features which have changed, i.e., the radar target 500 and support 502 as seen in FIG. 15C.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

While the embodiments described herein utilize a radar emitters and reflectors, in alternate configurations, each may be adapted to utilize emitters and reflectors associated with wavelengths outside those typically employed by radar systems. For example, emitters and reflectors configured to operate using energy in the microwave, optical, infrared, or ultraviolet wavelengths may be utilized without departing from the scope of the invention.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle onboard radar sensor service procedure, comprising:
   disposing a radar target within a field of view of the onboard radar sensor;
   activating the onboard radar sensor to observe said field of view and to generate an output representative of a plurality of radar reflective surfaces within said observed field of view;
   evaluating, at a processing system programmed with software instructions, said output to distinguishing said radar target from said plurality of radar-reflective surfaces visible to said onboard radar sensor within said field of view; and
   wherein said evaluation distinguishes said radar target from said plurality of radar-reflective surfaces by identifying, within said output, an occurrence of a radar reflection pattern associated with said radar target.

2. The service procedure of claim 1 wherein said radar reflection pattern associated with said radar target is generated by radar signals emitted from said onboard radar sensor incident upon a combination of two or more surface regions having differing radar return signal characteristics located within proximity to each other.

3. The service procedure of claim 1 wherein said radar reflection pattern associated with said radar target includes at least one region of Doppler-shift radar return signal characteristics.

4. The service procedure of claim 1 wherein said radar reflection pattern associated with said radar target includes at least one region in which time varying radar return signal characteristics are identified.

5. The service procedure of claim 1 wherein said radar reflection pattern associated with said radar target consists of a plurality of discrete regions each having a greater radar return signal strength than a surrounding region, and which are located in a known spatial relationship to each other within said field of view.

6. A vehicle inspection system, comprising:
   a processing system configured with software instructions to guide an operator through at least one of a calibration procedure, an inspection procedure, or an alignment procedure, associated with a vehicle onboard radar sensor, wherein said procedure requires the detection of a radar-observable target in proximity to the vehicle within a field of view of said vehicle onboard radar sensor; and
   a radar-observable target for placement in proximity to the vehicle, said radar-observable target having an associated radar signature consisting of a radar reflective boundary region, and at least one radar absorbing or radar dispersing sub-region contained within said radar reflective boundary region; and
   wherein said radar reflective boundary region and said at least one radar absorbing or radar dispersing sub-region are configured to facilitate detection of said target by said vehicle onboard radar sensor when said target is in close spatial proximity to background radar reflective surfaces associated with an automotive service environment.

7. The vehicle inspection system of claim 6 wherein said radar absorbing or radar dispersing sub-region is a surface disposed behind an opening within a surface of said radar reflective boundary region surface as observed from the vehicle onboard radar sensor.

8. A vehicle onboard radar sensor service procedure, comprising:
   positioning a vehicle having an onboard radar sensor within a vehicle service area;
   activating said onboard radar sensor to illuminate a field of view encompassing a portion of said vehicle service area;
   processing radar return signals from within said illuminated field of view to generate a first representation of said field of view visible to said onboard radar sensor;
   disposing a radar target structure within said field of view of the onboard radar sensor;
   activating said onboard radar sensor to illuminate a field of view encompassing a portion of said vehicle service area and said disposed radar target structure;
   processing radar return signals from within said illuminated field of view to generate a second representation of said field of view visible to said onboard radar sensor, said second representation including a representation of said disposed radar target structure;
   evaluating, at a processing system programmed with software instructions, said first and second representations of said field of view to identify differences there between, said differences including said representation of said disposed radar target structure; and
   evaluating, at said processing system, said identified differences to establish a spatial relationship between said disposed radar target structure and said vehicle onboard radar sensor.

9. The vehicle onboard radar sensor service procedure of claim 8 wherein said evaluation to identify said differences is a background subtraction procedure.

10. A process for calibrating, inspection, or aligning a vehicle onboard radar sensor, comprising:
   providing a radar-observable target in proximity to said vehicle, said radar-observable target having an associated radar signature consisting of a radar reflective boundary region together with at least one radar absorbing or radar dispersing sub-region contained within said radar reflective boundary region;
   guiding an operator to position said radar-observable target within a field of view of said vehicle onboard radar sensor; and
   reflecting, from said radar-observable target, a distinct radar energy signature to said vehicle onboard radar sensor distinguishing said radar-observable target from background radar reflective surfaces in close spatial proximity within an automotive service environment.

* * * * *